United States Patent
Nishath et al.

(10) Patent No.: US 9,843,478 B2
(45) Date of Patent: Dec. 12, 2017

(54) TEMPLATE BUILDER FOR END-TO-END PROVISIONING AND LIFECYCLE MANAGEMENT OF IT INFRASTRUCTURE AND SERVICES

(71) Applicant: DELL PRODUCTS L.P., Round Rock, TX (US)

(72) Inventors: Sogra Nishath, Cedar Park, TX (US); Ryan T. West, Round Rock, TX (US); Donna W. Brown, Round Rock, TX (US); Brooks Piggott, Pfugerville, TX (US)

(73) Assignee: DELL PRODUCTS L.P., Round Rocks, TX (US)

( * ) Notice: Subject to any disclaimer, the term of this patent is extended or adjusted under 35 U.S.C. 154(b) by 13 days.

(21) Appl. No.: 14/303,524

(22) Filed: Jun. 12, 2014

(65) Prior Publication Data
US 2015/0365282 A1  Dec. 17, 2015

(51) Int. Cl.
G06F 15/177 (2006.01)
H04L 12/24 (2006.01)
G06F 9/455 (2006.01)
H04L 29/08 (2006.01)

(52) U.S. Cl.
CPC ...... *H04L 41/0816* (2013.01); *G06F 9/45558* (2013.01); *G06F 2009/4557* (2013.01); *H04L 67/10* (2013.01); *H04L 67/1097* (2013.01)

(58) Field of Classification Search
CPC .................. H04L 41/0816; G06F 9/45558
See application file for complete search history.

(56) References Cited

U.S. PATENT DOCUMENTS

| | | | |
|---|---|---|---|
| 6,901,440 B1 | 5/2005 | Bimm et al. | |
| 7,216,163 B2 | 5/2007 | Sinn | |
| 7,275,037 B2 | 9/2007 | Lauer | |
| 8,027,354 B1 * | 9/2011 | Portolani | H04L 49/70 370/395.2 |
| 8,560,593 B2 * | 10/2013 | Ghostine | H04W 8/30 709/201 |
| 2003/0005119 A1 | 1/2003 | Mercier et al. | |
| 2010/0070732 A1 | 3/2010 | Strutt | |
| 2012/0096461 A1 * | 4/2012 | Goswami | G06F 9/45558 718/1 |
| 2012/0226876 A1 * | 9/2012 | Kawaguchi | G06F 3/0604 711/162 |
| 2013/0046892 A1 * | 2/2013 | Otani | G06F 15/173 709/226 |
| 2014/0075019 A1 | 3/2014 | Mordani et al. | |
| 2014/0137114 A1 * | 5/2014 | Bolte | G06F 9/45533 718/1 |
| 2015/0009222 A1 * | 1/2015 | Diard | G06F 9/45533 345/505 |
| 2015/0350019 A1 * | 12/2015 | Terayama | H04L 41/0816 709/221 |
| 2015/0365282 A1 * | 12/2015 | Nishath | H04L 41/0816 709/221 |
| 2016/0004551 A1 * | 1/2016 | Terayama | G06F 9/5011 718/1 |
| 2016/0021019 A1 * | 1/2016 | Parikh | G06F 9/45558 709/226 |
| 2016/0203027 A1 * | 7/2016 | Challa | G06F 9/5038 718/1 |

* cited by examiner

*Primary Examiner* — Brian Whipple
(74) *Attorney, Agent, or Firm* — Jackson Walker LLP; Christopher J. Rourk; Thomas B. Hayes (57) ABSTRACT

A system for creating or modifying a template is disclosed that includes a plurality of application controls configured to allow a user to modify one or more application parameters for an application associated with each application control. A plurality of virtual machine controls are configured to allow a user to modify one or virtual machine parameters for a virtual machine associated with each virtual machine control and to allow a user to associate each virtual machine control with one or more application control. The application controls are configured to allow a user to associate each application control with one or more virtual machine control.

21 Claims, 4 Drawing Sheets

TEMPLATE BUILDER FOR END-TO-END PROVISIONING AND LIFECYCLE MANAGEMENT OF IT INFRASTRUCTURE AND SERVICES

TECHNICAL FIELD

The present disclosure relates generally to information technology (IT)infrastructure and services, and more specifically to a template builder for end-to-end provisioning and lifecycle management of IT infrastructure and services.

BACKGROUND OF THE INVENTION

IT organizations must often manage large data centers that contain a variety of components from different manufacturers. The operational tasks for delivering services while managing the underlying infrastructure can be cumbersome. These tasks are typically performed through multiple management consoles for different physical and virtual resources, which can dramatically slow down service deployment.

SUMMARY OF THE INVENTION

A system for creating or modifying a template is disclosed that includes a plurality of application controls configured to allow a user to modify one or more application parameters for an application associated with each application control, such as for use within a service template. A plurality of virtual machine controls are configured to allow a user to modify one or virtual machine parameters for a virtual machine associated with each virtual machine control and to allow a user to associate each virtual machine control with one or more application controls. The application controls are configured to allow a user to associate each application control with one or more virtual machine control.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

Templates are an efficient way to simplify IT service delivery, to provide a centralized approach for capturing and applying workload-specific configuration data, and to ensure that best practices are followed. Such service templates allow infrastructure and workload configuration to be captured one time, and rely on a repeatable process to rapidly and reliably perform end-to-end provisioning and lifecycle management of IT infrastructure and services. The use of service templates can result in delivering significantly higher agility and efficiency to the business.

Creating these service templates in existing software applications often requires training and a long learning curve, can require input from multiple IT pros or specialists (such as storage specialists, server specialists and network specialists) and trial and error. Some software applications also use multiple templates for service deployment, such as for different types of equipment.

The present disclosure provides a novel approach to the template building process in which a visual hierarchy is automatically created as the user adds components to build the template. This visual hierarchy depicts a logical organization of the template components and is additionally used throughout the user interface to show the topology of the components used to make up the service based on the template. This process creates consistency and recognition between the initial template and the final output.

The creation of templates in the user interface does not need to rely on one or more multi-step wizard processes with no visual organization, or a visual organization that is manually organized by the user, because such processes are inefficient, error-prone and do not ensure that best practices will be replicated.

Figure 1:
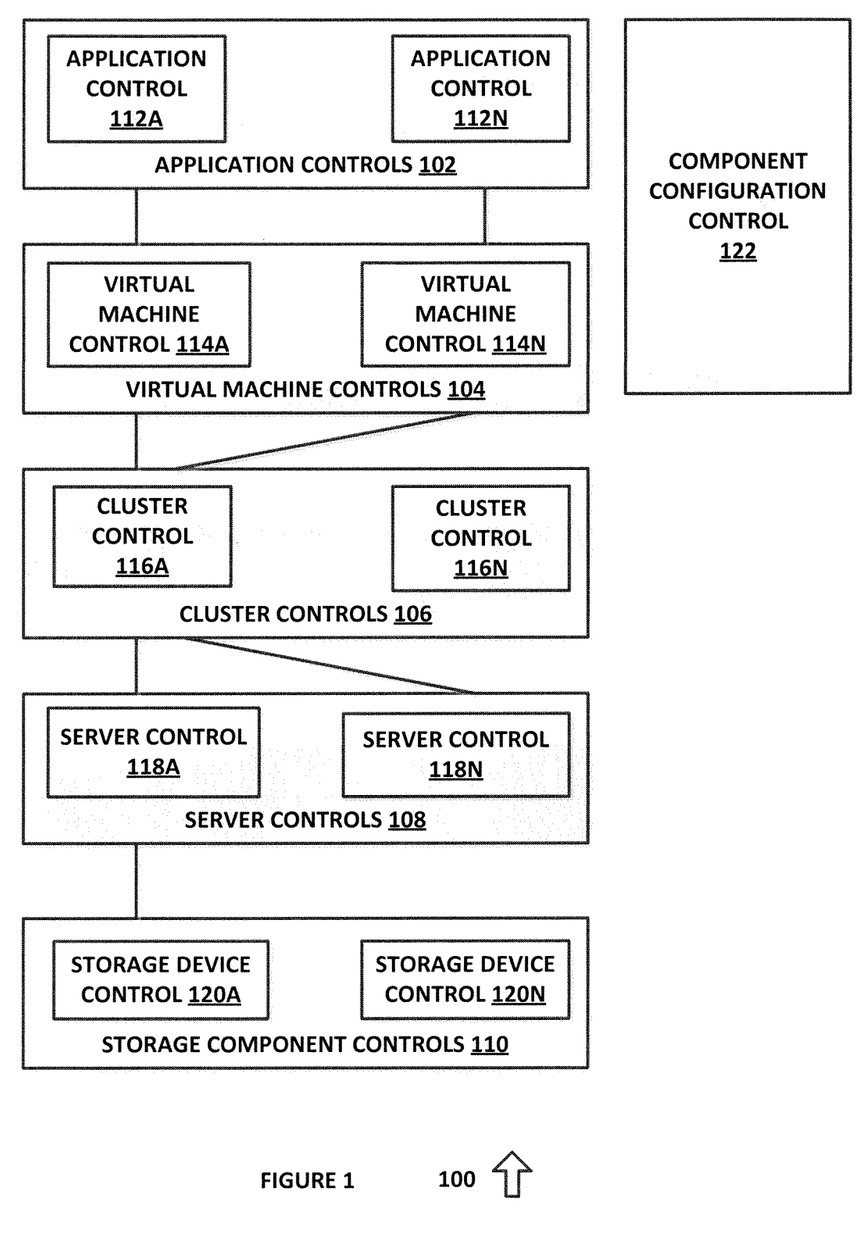
FIG. 1 is a diagram of a system for providing a template builder, in accordance with an exemplary embodiment of the present disclosure.

FIG. 1 is a diagram of a system 100 for providing a template builder, in accordance with an exemplary embodiment of the present disclosure. System 100 includes applications 102, virtual machines 104, clusters 106, servers 108, storage devices 110 and component configuration control 122, each of which can be implemented in hardware or a suitable combination of hardware and software, and which can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a touch screen controller, keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Application controls 102 can be configured on top of virtual resources, can be installed on a physical server or can be otherwise deployed as suitable. In one exemplary embodiment, applications 102 can be implemented as one or more application controls 112A through application control 112N, each having associated data, graphical and functional attributes that create a user-selectable control interface. The user controls can allow a user to adjust property settings for a selected application control 112A through 112N that are displayed in component configuration control 122. In one exemplary embodiment, a drop-down selection list can be generated that contains available applications, and based upon a user selection, the application properties can be displayed in component configuration control 122 with user-selectable setting controls. In one exemplary embodiment, a user can select related components to be mapped with the selected application, such as by selecting a server component.

Virtual machine controls 104 can be configured on top of a cluster, such as while building a template or in other suitable manners. Settings can be selected for virtual machine controls 114A through 114N for properties that are displayed in component configuration control 122. In another exemplary embodiment, a virtual machine control 114A through 114N can be selected from a drop down selection list or in other suitable manners. In response to the selected virtual machine control 114A through 114N, component configuration control 122 can identify the specific resource properties that are available for the selected virtual machine control. A virtual machine control 114A through 114N can also be added or deleted, as suitable. Settings can include one or more of the following exemplary controls:

Number of CPUs—the number of CPUs available for the virtual machine can be specified when configuring the virtual machine.

Memory—the memory in MB, GB or other suitable units for the virtual machine can be specified when configuring the virtual machine.

Number of NICs—the number of network interface controllers (NICs) can be specified when configuring a virtual machine.

In addition, virtual machine operating system settings can also be configured, such as:

Administrator password—an administrator password can be specified as part of the configuration for a virtual machine.

Confirm administrator password—the administrator password for a virtual machine can be confirmed.

OS Image—the OS images that are available for deployment can be identified as part of the virtual machine parameters.

OS Image Type—the OS type can be specified as part of the virtual machine parameters (such as Red Hat, Linux, Windows).

Custom Installation OS script—an Oracle Automated Storage Management (ASM)-maintained kickstart script, unattend.xml customer-specific script, or other suitable code for supporting unattended OS installation.

Cluster controls 106 can be configured to create a cluster inside a VMWare vCenter or other suitable clusters. Settings can be selected for cluster controls 116A through 116N by selecting an existing cluster icon, by creating a new cluster icon or in other suitable manners. The available settings can be displayed in component configuration control 122 for the selected cluster control, by using a drop-down list allows a user to select a cluster control and to modify settings on the selected cluster control, or in other suitable manners. Related components for a cluster control can also or alternatively be selected from a component drop-down list. In addition, the following features can be selected or configured for each cluster control 116A through 116N:

Data Center Name—the name of the data center to be created in vCenter can be provided.

Cluster Name—the name of the cluster to be created in the Data Center can be provided.

Cluster Data Store—the cluster can be mapped to a selected storage component.

Server controls 108 can be used to provision a physical server. Settings can be selected for server controls 118A through 118N by selecting an existing server icon, by creating a new server icon or in other suitable manners. The available settings can be displayed in component configuration control 122 for the selected server control, by using a drop-down list allows a user to select a server control and modify settings on the selected server control properties, or in other suitable manners. Related components for a server control can also or alternatively be selected from a component drop-down list. In addition, the following features can be selected or configured for each server control 118A through 118N:

Target Boot Device—the target boot device for a server can be specified, such as a local hard drive, an SD card, or other suitable devices.

Server Pool—the associated server pool whose resource is being used can be specified, a global value can be used to select any server pool from resources identified in ASM.OS settings, or other suitable resources can be specified.

Administrator Password—the administrator password can be specified.

Confirm Administrator Password—a specified administrator password can be confirmed while configuring a server component.

OS Image—the OS image for a server can be specified.

OS Image Type—the OS type can be specified as part of the server parameters (such as Red Hat, Linux, Windows).

Custom Installation OS script—an Oracle Automated Storage Management (ASM)-maintained kickstart script, unattend.xml customer-specific script, or other suitable code for supporting unattended OS installation can be specified.

Network Settings for each server control 118A through 118N can also be specified, such as:

Identity Pool—the identity pool that is used to connect to the storage devices can be specified, a global value can be specified to choose the identities or MAC addresses, IQNs, WWNNs and WWPNs, or other suitable data can be identified.

Host Name—the host name that is set during deployment can be specified.

Hypervisor Management Network—networks of the type "Hypervisor Management" can be specified.

Hypervisor vMotion Network—Hypervisors available for vMotion can be specified.

Storage Network—storage area network (SAN) Internet small computing system interface (iSCSI) networks, fiber channel over Ethernet (FCoE) networks or other suitable networks can be specified.

PXE Network—the pre-boot execution environment (PXE) based OS imaging on servers can be configured, a specified VLAN can be configured as an un-tagged VLAN on top of rack (ToR) switches, input output adapter switches or other suitable settings can be specified.

Workload Templates—the private networks and public networks can be specified in the network stage. In one exemplary embodiment, upon entering information about a PXE network in the respective field as described in the table above, ASM can untag vLANs entered by the user in the PXE network on the switch server facing port. In the case of vMotion and Hypervisor networks, the ASM can tag these networks on the switch server facing ports. In the case of rack servers, the ASM can configure those vLANs on TOR server facing ports (untag PXE vLANs, and tag other vLANs). In the case of blade servers, the ASM can configure those vLANs on the IOM server facing ports (untag PXE vLANs and tag other vLANs). Other suitable workload templates can also or alternatively be used.

In addition, other suitable controls include BIOS settings (system profile ports on/off, user-accessible USB ports on/off, number of core processors, processor virtualization technology, logical processor, memory node interlacing, integrated RAID controller, execute disable), RAID settings (RAID level, advanced RAID configuration (virtual disks and RAID levels)), fabric configuration (rack server, blade server, fabric enable/disable) and other suitable controls.

Storage component controls 110 can be used to provision a storage device, such as by selecting one of storage component controls 120A through 120N, by creating a new storage device control or in other suitable manners. A storage component can be provisioned first and then virtual resources and applications can be configured while building a template. The available settings can be displayed in component configuration control 122 for the selected storage component control, by using a drop-down list that allows a user to select a storage device instance and modify settings on the selected storage device instance properties, or in other suitable manners. Related components for a storage device can also or alternatively be selected from a component drop-down list. In addition, the following features can be selected or configured for each storage component control 120A through 120N:

Storage Volume—can be used to specify the name of the storage volume, such as in Equallogic or other suitable applications. In one exemplary embodiment, a volume can be a logical partition in an EqualLogic storage array.

Storage Pool—can be used to specify the pool name where a volume is, where a default storage pool value can be provided.

Storage Size (e.g. 100m, 1g)—Specifies the volume size.

Thin Provisioning—Enables thin provisioning on a selected volume. The possible values can be enable or disable.

Snapshot Reserve %—Refers to the amount of space, as a percentage of the volume size, to reserve for a snapshot.

Thin Min Reserve %—Sets the minimum reserved size for thin provisioned volume configured as percentage of total volume size. This value cannot be less than 10%.

Thin Growth Warning %—can be used to specify a warning threshold percentage for thin-provisioned volume, where a warning message is displayed when the thin-reserve reaches the specified value; can have a default value (such as 60%), and can have other suitable associated data.

Thin Growth Maximum %—can be used to specify a maximum growth percentage for a thin volume, where the volume is set to offline when thin-reserve reaches the specified value; can have a default value (such as 80%) and can have other suitable associated data.

Thin Warning on Threshold %—can be used to specify whether or not a thin provisioning sends an initiator warning when passing the in-use warning threshold, and can have other suitable associated data.

Thin Warning Hard Threshold %—can be used to specify whether thin provisioning allows the volume to remain online after reaching a maximum-growth threshold, and can have other suitable associated data.

Multi-host Access of Volume—can be used to enable or disable multi-host access on a volume, can have values of enable and disable, and can have other suitable associated data.

CHAP username—can be used to specify a challenge-handshake access protocol (CHAP) username, and can have other suitable associated data.

CHAP Secret—can be used to specify a CHAP password, to auto-generate a CHAP password if one is not specified, and can have other suitable associated data.

Storage Volume—can be used to specify a name of the volume.

Storage Size—can be used to specifies the volume size, such as by entering a number of 512-byte blocks or the total byte size, and can have other suitable associated data.

Boot Volume—can be used to specify whether a mapped volume is designated to be a boot volume, and can have other suitable associated data.

Volume Folder—can be used to specify a name of an existing volume folder where a volume is to be created; if a folder does not exist, a new folder can be created, and can have other suitable associated data.

Purge Volume—can be used to indicate that the volume will be purged; if the purge option is not specified, the volume can remain visible, the possible values for this parameter can be yes and no, where the default value is yes, and can have other suitable associated data.

Volume Notes—can be used to specify the notes for the volume, can have a default value of no included notes, and can have other suitable associated data.

Replay Profile—Specifies the replay profiles for the volume.

Storage Profile Name—can be used to specify the replay profiles for the volume, and can have other suitable associated data.

Server Notes—can be used to specify optional user notes associated with the server, and can have other suitable associated data.

Server Object Name—Refers to the server name that is to be created or destroyed.

Operating System Name—can be used to specify a name of an operating system hosted on the server, and can have other suitable associated data.

Server Object Folder—can be used to specify a folder for the server, and can have other suitable associated data.

Server WWN Values—can be used to specify a globally unique world wide name (WWN) for a requested host bus adapter (HBA), and can have other suitable associated data.

Port Type—can be used to specify a transport type for a host bus adapter (HBA) that is being added, can be required if the manual flag is set, can have values of FibreChannel and iSCSI, and can have other suitable associated data.

Manual—can be used to set a flag to configure a requested HBA, if an associated WWN matches a known server port, then this flag can be ignored, if this flag is present, then the port type can also be specified, can have values of true and false and can have other suitable associated data.

Force Map—can be used to specify a value to force mapping, even where mapping already exists, can have values of true and false and can have other suitable associated data.

Map Read Only—can be used to specify whether a map is read only or not, can have values of true and false, and can have other suitable associated data.

Single Path Map—can be used to specify whether a single local port can be used for mapping, can be omitted if all local ports are used for mapping, can have values of true and false, and can have other suitable associated data.

Component configuration control 122 displays the available settings, parameters or other data associated with a selected application control, virtual machine control, cluster control, server control, storage device control or other suitable controls. In one exemplary embodiment, the data displayed in component configuration control 122 can include a pull-down list of available values for each field or other suitable user-selectable data entry fields.

The application controls 102, virtual machine controls 104, cluster controls 106, server controls 108, storage device controls 110 and other suitable controls can be associated with each other as shown, with one-to-one, one-to-many or many-to-one connections. In one exemplary embodiment, connections can be shown after they are defined using component configuration control 122. In another exemplary embodiment, connections can be created using the graphic user interface of system 100, such as by allowing a user to select a connection between two selected controls, to automatically populate the associated data fields for each control, to generate a graphical display that shows the associated connections and to perform other suitable functions.

In addition to the connections discussed above, there are a number of components that can be selected and specified, as discussed in the previous sections. However, certain combinations of these components can logically be used together. The following table provides information about component combinations that can be used for template creation. In each vertical column of the table, an X indicates the set of components that can be used together in the same template. For example, a template can contain 1) only storage, 2) storage and server, 3) storage, server, and cluster, and so on.

| Application |   |   |   |   | X |   |   | X |   |
|---|---|---|---|---|---|---|---|---|---|
| Virtual Machine |   |   | X | X |   |   | X | X | X |
| Cluster |   | X | X | X |   | X | X | X | X |
| Server | X | X | X | X | X |   |   |   | X |
| Storage | X | X | X | X | X |   |   |   |   |

These combinations are exemplary, and other suitable components and combinations can also or alternatively be used. In addition, while the following algorithms provide exemplary processes for creating controls and connections between controls, the algorithms can be modified to provide the connections shown the above chart or other suitable connections between other suitable components, including but not limited to switches, routers, controllers, user devices, communication devices, cloud services or other suitable components.

Figure 2:
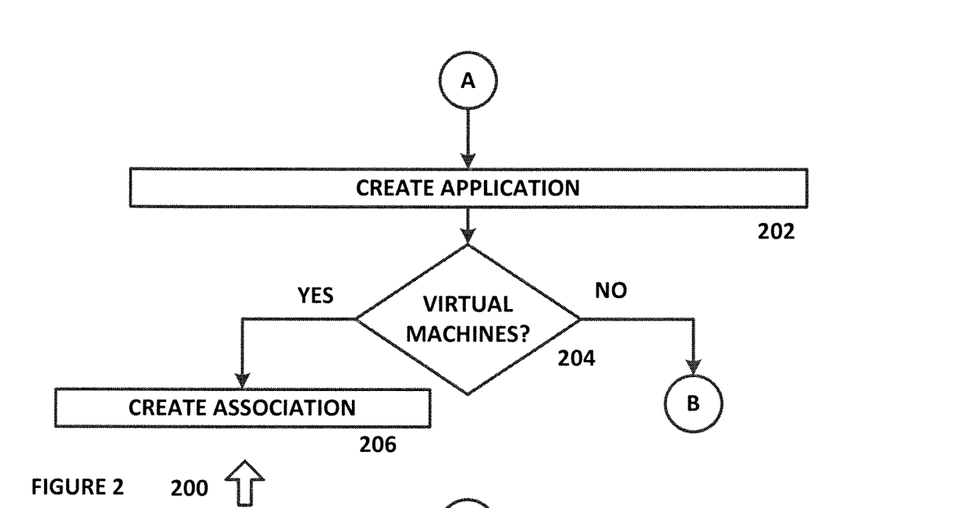
FIG. 2 is a diagram of an algorithm for creating an application control for use in a template or other suitable applications, and for associating the application control with a virtual machine control, in accordance with an exemplary embodiment of the present disclosure.

FIG. 2 is a diagram of an algorithm 200 for creating an application control for use in a template or other suitable applications, and for associating the application control with one or more virtual machine control, in accordance with an exemplary embodiment of the present disclosure. Algorithm 200 can be implemented in hardware or a suitable combination of hardware and software, and can be one or lines of code operating on a processor.

Algorithm 200 begins at 202, where an application control is created. In one exemplary embodiment, a user can select a control from a user interface device such as a graphic user interface screen with a mouse, a touch screen controller or other suitable selection device, and can create an application control that identifies an associated application. In addition, one or more attributes for the application control can also be selected or entered by the user using one or more application attribute selection controls, such as those described in further detail herein. The algorithm then proceeds to 204, where it is determined whether a virtual machine control or controls are available to be associated with the application control. If it is determined that one or more virtual machine controls are available, the algorithm proceeds to 206 where a user control is generated to allow the user to select one or more of the virtual machine controls for association with the application control. Otherwise, the algorithm proceeds to 302 of algorithm 300.

In operation, algorithm 200 allows a user to create an application control and to associate the application control with one or more virtual machine controls. The application control created using algorithm 200 can be used to generate a service template or for other suitable purposes. Although algorithm 200 is shown as a flow chart, object-oriented programming, state diagrams or other suitable programming conventions or paradigms can also or alternatively be used.

Figure 3:
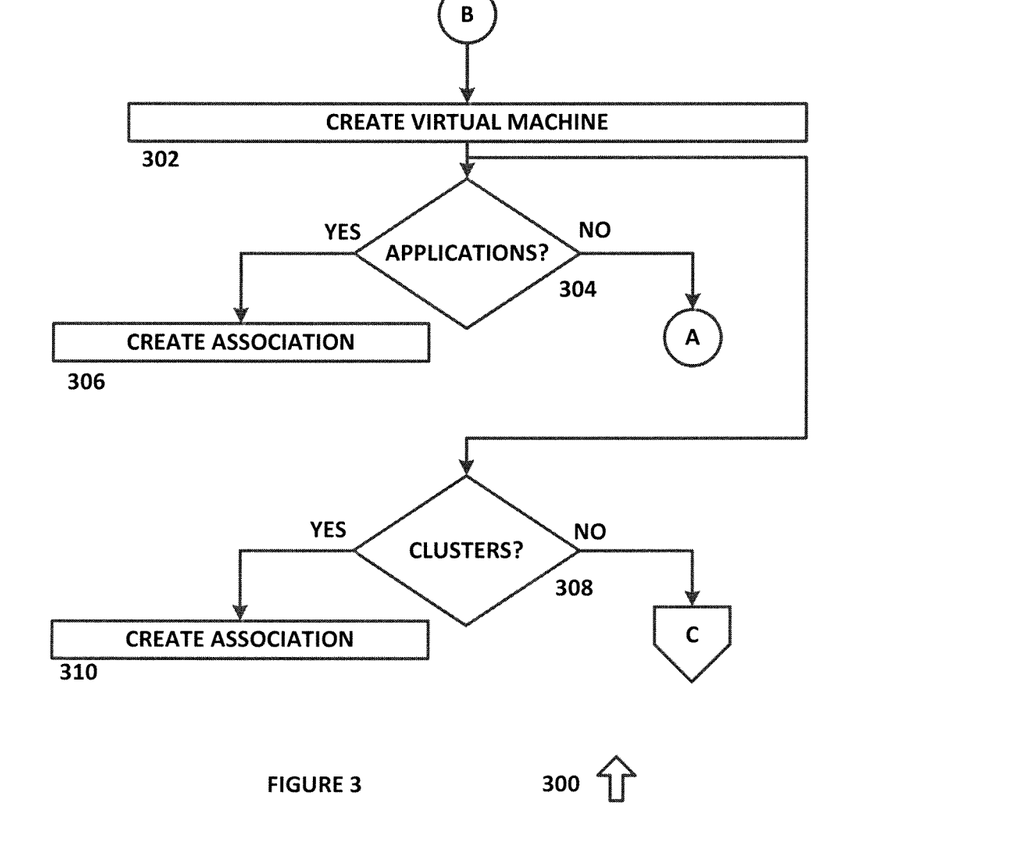
FIG. 3 is a diagram of an algorithm for creating a virtual machine control for use in a template or other suitable applications, and for associating the virtual machine control with an application control and a cluster control, in accordance with an exemplary embodiment of the present disclosure.

FIG. 3 is a diagram of an algorithm 300 for creating a virtual machine control for use in a template or other suitable applications, and for associating the virtual machine control with one or more application control and one or more cluster control, in accordance with an exemplary embodiment of the present disclosure. Algorithm 300 can be implemented in hardware or a suitable combination of hardware and software, and can be one or lines of code operating on a processor.

Algorithm 300 begins at 302, where a virtual machine control is created. In one exemplary embodiment, a user can select a virtual machine control from a user interface device such as a graphic user interface screen with a mouse, a touch screen controller or other suitable selection device, can create a virtual machine control that identifies an associated virtual machine, or other suitable processes can also or alternatively be used. In addition, one or more attributes for the virtual machine control can also be selected or entered by the user using one or more virtual machine attribute selection controls, such as those described in further detail herein. The algorithm then proceeds to 304, where it is determined whether an application control or controls are available to be associated with the virtual machine control. If it is determined that one or more application controls are available, the algorithm proceeds to 306 where a user control is generated to allow the user to select one or more of the application controls for association with the virtual machine control. Otherwise, the algorithm proceeds to 202 of algorithm 200.

After creation of a virtual machine control at 302, the algorithm also proceeds to 308, where it is determined whether a cluster control or controls are available to be associated with the virtual machine control. If it is determined that one or more cluster controls are available, the algorithm proceeds to 310 where a user control is generated to allow the user to select one or more of the cluster controls for association with the virtual machine control. Otherwise, the algorithm proceeds to 402 of algorithm 400.

In operation, algorithm 300 allows a user to create a virtual machine control and to associate the virtual machine control with one or more application controls or cluster controls. The virtual machine control created using algorithm 300 can be used to generate a service template or for other suitable purposes. Although algorithm 300 is shown as a flow chart, object-oriented programming, state diagrams or other suitable programming conventions or paradigms can also or alternatively be used.

Figure 4:
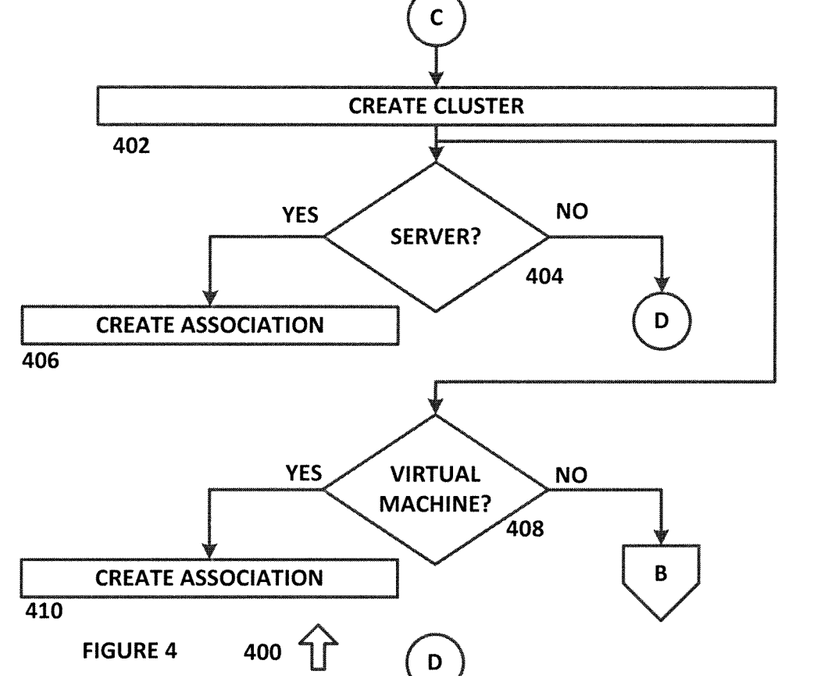
FIG. 4 is a diagram of an algorithm for creating a cluster control for use in a template or other suitable applications and for associating the cluster control with a server control and a virtual machine control, in accordance with an exemplary embodiment of the present disclosure.

FIG. 4 is a diagram of an algorithm 400 for creating a cluster control for use in a template or other suitable applications and for associating the cluster control with one or more server control and one or more virtual machine control, in accordance with an exemplary embodiment of the present disclosure. Algorithm 400 can be implemented in hardware or a suitable combination of hardware and software, and can be one or lines of code operating on a processor.

Algorithm 400 begins at 402, where a cluster control is created. In one exemplary embodiment, a user can select a cluster control from a user interface device such as a graphic user interface screen with a mouse, a touch screen controller or other suitable selection device, can create a cluster control that identifies an associated cluster, or other suitable processes can also or alternatively be used. In addition, one or more attributes for the cluster control can also be selected or entered by the user using one or more cluster attribute selection controls, such as those described in further detail herein. The algorithm then proceeds to 404, where it is determined whether a server control or controls are available to be associated with the cluster control. If it is determined that one or more server controls are available, the algorithm proceeds to 406 where a user control is generated to allow the user to select one or more of the server controls for association with the cluster control. Otherwise, the algorithm proceeds to 502 of algorithm 500.

After creation of a cluster control at 402, the algorithm also proceeds to 408, where it is determined whether a virtual machine control or controls are available to be associated with the cluster control. If it is determined that one or more virtual machine controls are available, the algorithm proceeds to 410 where a user control is generated to allow the user to select one or more of the virtual machine controls for association with the cluster control. Otherwise, the algorithm proceeds to 302 of algorithm 300.

In operation, algorithm 400 allows a user to create a cluster control and to associate the cluster control with one or more server controls or virtual machine controls. The cluster control created using algorithm 400 can be used to generate a service template or for other suitable purposes. Although algorithm 400 is shown as a flow chart, object-oriented programming, state diagrams or other suitable programming conventions or paradigms can also or alternatively be used.

Figure 5:
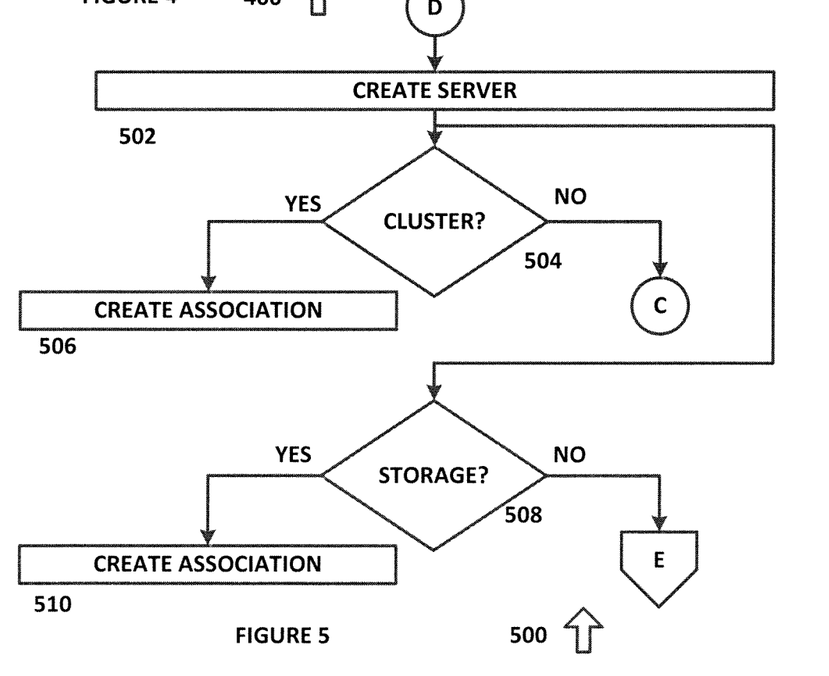
FIG. 5 is a diagram of an algorithm for creating a server control for use in a template or other suitable applications, and for associating the server control with a cluster control and a storage control, in accordance with an exemplary embodiment of the present disclosure.

FIG. 5 is a diagram of an algorithm 500 for creating a server control for use in a template or other suitable applications, and for associating the server control with one or more cluster control and one or more storage control, in accordance with an exemplary embodiment of the present disclosure. Algorithm 500 can be implemented in hardware or a suitable combination of hardware and software, and can be one or lines of code operating on a processor.

Algorithm 500 begins at 502, where a server control is created. In one exemplary embodiment, a user can select a server control from a user interface device such as a graphic user interface screen with a mouse, a touch screen controller or other suitable selection device, can create a server control that identifies an associated server, or other suitable processes can also or alternatively be used. In addition, one or more attributes for the server control can also be selected or entered by the user using one or more server attribute selection controls, such as those described in further detail herein. The algorithm then proceeds to 504, where it is determined whether a cluster control or controls are available to be associated with the server control. If it is determined that one or more cluster controls are available, the algorithm proceeds to 506 where a user control is generated to allow the user to select one or more of the cluster controls for association with the server control. Otherwise, the algorithm proceeds to 502 of algorithm 500.

After creation of a server control at 502, the algorithm also proceeds to 508, where it is determined whether a storage component control or controls are available to be associated with the server control. If it is determined that one or more storage component controls are available, the algorithm proceeds to 510 where a user control is generated to allow the user to select one or more of the storage component controls for association with the server control. Otherwise, the algorithm proceeds to 602 of algorithm 600.

In operation, algorithm 500 allows a user to create a server control and to associate the server control with one or more cluster controls or storage component controls. The server control created using algorithm 500 can be used to generate a service template or for other suitable purposes. Although algorithm 500 is shown as a flow chart, object-oriented programming, state diagrams or other suitable programming conventions or paradigms can also or alternatively be used.

Figure 6:
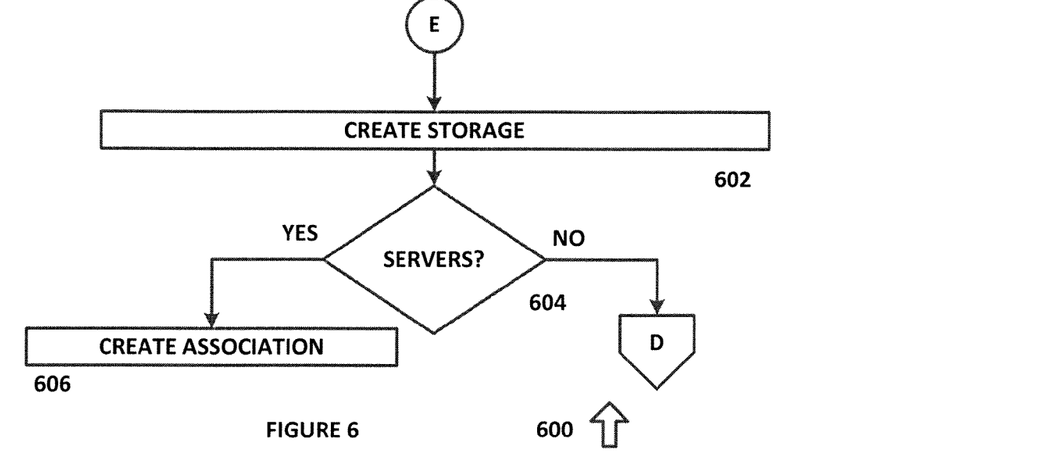
FIG. 6 is a diagram of an algorithm for creating a storage component control for use in a template or for other suitable uses, and for associating the storage component control with a server control, in accordance with an exemplary embodiment of the present disclosure.

FIG. 6 is a diagram of an algorithm 600 for creating a storage component control for use in a template or for other suitable uses, and for associating the storage component control with a server control, in accordance with an exemplary embodiment of the present disclosure. Algorithm 600 can be implemented in hardware or a suitable combination of hardware and software, and can be one or lines of code operating on a processor.

Algorithm 600 begins at 602, where a storage component control is created. In one exemplary embodiment, a user can select a storage component control from a user interface device such as a graphic user interface screen with a mouse, a touch screen controller or other suitable selection device, can create a storage component control that identifies an associated storage component, or other suitable processes an also or alternatively be used. In addition, one or more attributes for the storage component control can also be selected or entered by the user using one or more storage component attribute selection controls, such as those described in further detail herein. The algorithm then proceeds to 604, where it is determined whether a server control or controls are available to be associated with the storage component control. If it is determined that one or more server controls are available, the algorithm proceeds to 606 where a user control is generated to allow the user to select one or more of the server controls for association with the application control. Otherwise, the algorithm proceeds to 502 of algorithm 500.

In operation, algorithm 600 allows a user to create a control for a storage component and to associate the control with one or more servers. The storage component control created using algorithm 600 can be used to generate a service template or for other suitable purposes. Although algorithm 600 is shown as a flow chart, object-oriented programming, state diagrams or other suitable programming conventions or paradigms can also or alternatively be used.

Figure 7:
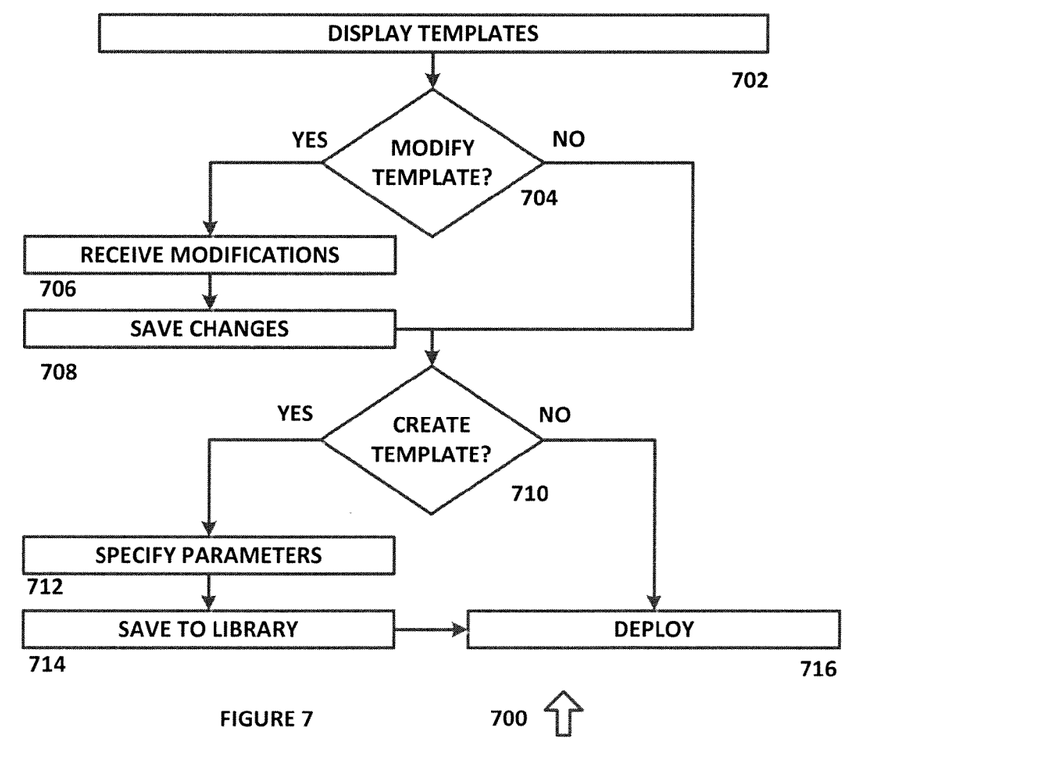
FIG. 7 is a diagram of an algorithm for creating, modifying and deploying service templates, in accordance with an exemplary embodiment of the present disclosure.

FIG. 7 is a diagram of an algorithm 700 for creating, modifying and deploying service templates, in accordance with an exemplary embodiment of the present disclosure. Algorithm 700 can be implemented in hardware or a suitable combination of hardware and software, and can be one or lines of code operating on a processor.

Algorithm 700 begins at 702, where a list of available templates is displayed. In one exemplary embodiment, the list can be displayed in test format, as a series of icons or in other suitable manners. The algorithm then proceeds to 704.

At 704, it is determined whether a user has made a selection to modify one of the templates. In one exemplary embodiment, the user can select one of the templates in the list and activate a control to allow the user to modify the template, or other suitable processes can also or alternatively be used. If it is determined that the user has not made a selection to modify a template, the algorithm proceeds to 710, otherwise the algorithm proceeds to 706 where one or more modifications to the selected template is made. In one exemplary embodiment, the user can activate one or more editing controls associated with the template, such as those described in greater detail herein. The algorithm then proceeds to 708, where the modified template is saved, such as a new version, a new template or in other suitable manners. Likewise, the user can be provided with the option to exit without saving, the modified template can be automatically saved if the user exits without taking a specific action to save the modified template, or other suitable processes can also or alternatively be implemented. The algorithm then proceeds to 710.

At 710, it is determined whether a user has made a selection to create a template. In one exemplary embodiment, the user can activate a control to allow the user to create a template or other suitable processes can also or alternatively be used. If it is determined that the user has not made a selection to create a template, the algorithm proceeds to 716 where the templates are deployed, otherwise the algorithm proceeds to 712 where one or more parameters are specified for the new template. In one exemplary embodiment, the user can activate one or more editing controls associated with the template, such as those described in greater detail herein. The algorithm then proceeds to 714, where the new template is saved to a template library or other suitable locations. Likewise, the user can be provided with the option to exit without saving, the new template can be automatically saved if the user exits without taking a specific action to save the new template, or other suitable processes can also or alternatively be implemented. The algorithm then proceeds to 716.

In operation, algorithm 700 allows a user to modify or create a template, such as a service template that utilizes one or more predetermined controls. Although algorithm 700 is shown as a flow chart, object-oriented programming, state diagrams or other suitable programming conventions or paradigms can also or alternatively be used.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A computer system comprising hardware for creating or modifying a template, comprising:
   a plurality of application controls configured to allow a user to modify one or more application parameters of the template for an application associated with each application control;
   a plurality of virtual machine controls configured to allow a user to modify one or more virtual machine parameters of the template for a virtual machine associated with each virtual machine control and to allow a user to associate each virtual machine control with one or more application control; and
   wherein the application controls of the template are configured to allow a user to associate each application control with one or more virtual machine control.

2. The computer system of claim 1 further comprising a plurality of cluster controls configured to allow a user to modify one or more cluster parameters of the template for a cluster associated with each cluster control, wherein the cluster controls are configured to allow a user to associate each cluster control with one or more virtual machine controls.

3. The computer system of claim 1 further comprising a plurality of server controls configured to allow a user to modify one or more server parameters of the template for a server associated with each server control, wherein the server controls are configured to allow a user to associate each server control with one or more cluster controls.

4. The computer system of claim 1 further comprising a plurality of storage component controls configured to allow a user to modify one or more storage component parameters of the template for a storage component associated with each storage component control, wherein the storage component controls are configured to allow a user to associate each storage component control with one or more server controls.

5. The computer system of claim 1 wherein one or more of the plurality of virtual machine controls comprises a control for selecting a number of CPUs available for the virtual machine of the template.

6. The computer system of claim 1 wherein one or more of the plurality of virtual machine controls comprises a control for selecting a memory allocation for the virtual machine of the template.

7. The computer system of claim 1 wherein one or more of the plurality of virtual machine controls comprises a control for specifying a number of network interface controllers for the virtual machine of the template.

8. The computer system of claim 1 wherein the virtual machine controls further comprise one or more virtual machine operating system controls of the template associated with one or more operating systems.

9. The computer system of claim 8 wherein the one or more virtual machine operating system controls comprise an operating system image control for selecting one of a plurality of operating system images that are available for deployment with the template.

10. The computer system of claim 8 wherein the one or more virtual machine operating system controls comprise an operating system image type control for selecting one of a plurality of different operating system types for the template.

11. The computer system of claim 8 wherein the one or more virtual machine operating system controls comprise a custom installation operating system script control for selecting one of a plurality of operating system scripts for the template.

12. The computer system of claim 11 wherein the operating system scripts comprise one or more of an Oracle Automated Storage Management (ASM)-maintained kickstart script and an unattend.xml customer-specific script for the template.

13. The computer system of claim 3 wherein the server controls comprise an identity pool control that is used to connect one or more servers to one or more storage devices of the template.

14. The computer system of claim 3 wherein the server controls comprise a host name control that can set a host name during deployment of the template.

15. The computer system of claim 3 wherein the server controls comprise a Hypervisor management network control that can specify networks of the type Hypervisor Management for the template.

16. The computer system of claim 3 wherein the server controls comprise an storage network control for specifying one or more of a storage area network (SAN) Internet small computing system interface (iSCSI) networks and a fiber channel over Ethernet (FCoE) network for the template.

17. A method for creating or modifying a template, comprising:
modifying one or more application parameters of the template for an application associated with an application control using a processor;
modifying one or more virtual machine parameters of the template for a virtual machine associated with a virtual machine control using the processor;
associating the virtual machine control with one or more application controls of the template using the processor; and
associating the application control with one or more virtual machine controls of the template using the processor.

18. The method of claim 17 further comprising:
modifying one or more cluster parameters of the template for a cluster associated with a cluster control using the processor; and
associating the cluster control with one or more virtual machine controls using the processor.

19. The method of claim 17 further comprising:
modifying one or more server parameters of the template for a server associated with a server control using the processor; and
associating the server control with one or more cluster controls using the processor.

20. The method of claim 17 further comprising:
modifying one or more storage component parameters of the template for a storage component associated with a storage component control; and
associating each storage component control with one or more server controls using the processor.

21. The method of claim 17 further comprising deploying the template on a general purpose computer to transform the general purpose computer into a special purpose computer that is configured to implement the template.

* * * * *

UNITED STATES PATENT AND TRADEMARK OFFICE
CERTIFICATE OF CORRECTION

PATENT NO. : 9,843,478 B2
APPLICATION NO. : 14/303524
DATED : December 12, 2017
INVENTOR(S) : Sogra Nishath et al.

Page 1 of 1

It is certified that error appears in the above-identified patent and that said Letters Patent is hereby corrected as shown below:

On the Title Page

1. In Item (72), under "Inventors", in Column 1, Line 4, delete "Pfugerville," and insert -- Pflugerville, --, therefor.

2. In Item (73), under "Assignee", in Column 1, Line 2, delete "Rocks," and insert -- Rock, --, therefor.

3. In Item (57), under "ABSTRACT", in Column 2, Line 6, delete "one or virtual" and insert -- one or more virtual --, therefor.

In the Specification

4. In Column 1, Line 9, delete "(IT)infrastructure" and insert -- (IT) infrastructure --, therefor.

5. In Column 10, Line 39, delete "502 of algorithm 500." and insert -- 402 of algorithm 400. --, therefor.

In the Claims

6. In Column 13, Line 40, in Claim 16, delete "an storage" and insert -- a storage --, therefor.

7. In Column 14, Line 1, in Claim 16, delete "(SAN)" and insert -- (SAN), --, therefor.

Signed and Sealed this
Twentieth Day of November, 2018

Andrei Iancu
*Director of the United States Patent and Trademark Office*